(12) United States Patent
Hankins et al.

(10) Patent No.: US 8,995,713 B2
(45) Date of Patent: Mar. 31, 2015

(54) MOTION TRACKING USING IDENTIFYING FEATURE REQUIRING LINE OF SIGHT OF CAMERA

(75) Inventors: Linh Hankins, Milpitas, CA (US); Hideaki Tanioka, San Jose, CA (US); Matthew Depetro, Sunnyvale, CA (US)

(73) Assignee: Fujitsu Limited, Kawasaki-shi (JP)

( * ) Notice: Subject to any disclaimer, the term of this patent is extended or adjusted under 35 U.S.C. 154(b) by 120 days.

(21) Appl. No.: 13/093,183

(22) Filed: Apr. 25, 2011

(65) Prior Publication Data

US 2012/0269386 A1 Oct. 25, 2012

(51) Int. Cl.
G06K 9/00 (2006.01)
H04N 7/18 (2006.01)

(52) U.S. Cl.
CPC .................................. *H04N 7/185* (2013.01)
USPC ......................................................... 382/103

(58) Field of Classification Search
None
See application file for complete search history.

(56) References Cited

U.S. PATENT DOCUMENTS

| 8,125,529 | B2 * | 2/2012 | Skoskiewicz et al. ..... 348/211.2 |
| 8,254,633 | B1 * | 8/2012 | Moon et al. .................... 382/103 |
| 2004/0169587 | A1 * | 9/2004 | Washington ............... 340/573.1 |
| 2006/0028552 | A1 * | 2/2006 | Aggarwal et al. ............. 348/169 |
| 2009/0095047 | A1 * | 4/2009 | Patel et al. ...................... 73/1.01 |
| 2009/0138138 | A1 * | 5/2009 | Ferren et al. ....................... 701/3 |
| 2010/0201829 | A1 * | 8/2010 | Skoskiewicz et al. ..... 348/211.2 |
| 2010/0245588 | A1 | 9/2010 | Waehner et al. |
| 2010/0301113 | A1 * | 12/2010 | Bohn et al. ..................... 235/380 |
| 2011/0007157 | A1 * | 1/2011 | Sekelsky et al. .............. 348/143 |
| 2011/0191023 | A1 * | 8/2011 | Engstrom ..................... 701/208 |
| 2011/0306400 | A1 | 12/2011 | Nguyen |
| 2012/0268589 | A1 * | 10/2012 | Hankins et al. ............... 348/143 |
| 2012/0269386 | A1 * | 10/2012 | Hankins et al. ............... 382/103 |

OTHER PUBLICATIONS

"Sightline" Wikipedia, Wikimedia Foundation, Last modified on Mar. 8, 2013, Date Accessed Aug. 1, 2013, http://en.wikipedia.org/w/index.php?title=Sightline&oldid=542738193.*
U.S. Appl. No. 13/093,234, filed Apr. 25, 2011, Hankins.
Non-Final Office Action dated Sep. 11, 2013; U.S. Appl. No. 13/093,234; Inventor: Linh Hankins, Sep. 11, 2013.

* cited by examiner

*Primary Examiner* — Tahmina Ansari
(74) *Attorney, Agent, or Firm* — Baker Botts L.L.P.

(57) ABSTRACT

In one embodiment, one or more computing devices receive an identifying feature of a target entity, the identifying feature requiring that the target entity to be in a line of sight of a camera for the camera to recognize the identifying feature; locate the target entity using the camera based on the identifying feature; and track the target entity using the camera based on the identifying feature.

23 Claims, 2 Drawing Sheets

MOTION TRACKING USING IDENTIFYING FEATURE REQUIRING LINE OF SIGHT OF CAMERA

TECHNICAL FIELD

This disclosure generally relates to automatically tracking a moving entity with a video camera.

BACKGROUND

Moving entities, such as humans, animals, or objects, may be tracked with video cameras (e.g., surveillance cameras). For example, many surveillance cameras are equipped with pan, tilt, zoom, and motion tracking capabilities and may be used to track moving entities in the vicinities of the cameras over some periods of time.

DESCRIPTION OF EXAMPLE EMBODIMENTS

Many existing surveillance cameras are equipped with pan, tilt, zoom, and motion tracking capabilities. For example, most motion tracking cameras are programmed to either track any movements (e.g., activities in a parking lot) or track fast moving entities (e.g., vehicles driving down a street). However, they often lack the ability to track moving entities by specification. That is, existing motion tracking technologies can be programmed to track moving entities in general but cannot be programmed to track a specific target entity.

Particular embodiments program a video camera to track a specific entity, which may be referred to as a target entity. The target entity is identified by an identifying feature. The video camera, once programmed to track the target entity with the identifying feature, is able to track the target entity while the target entity is in the vicinity of the video camera (e.g., within the range of the video camera), even when the target entity remains stationary (i.e., not moving).

Figure 1:
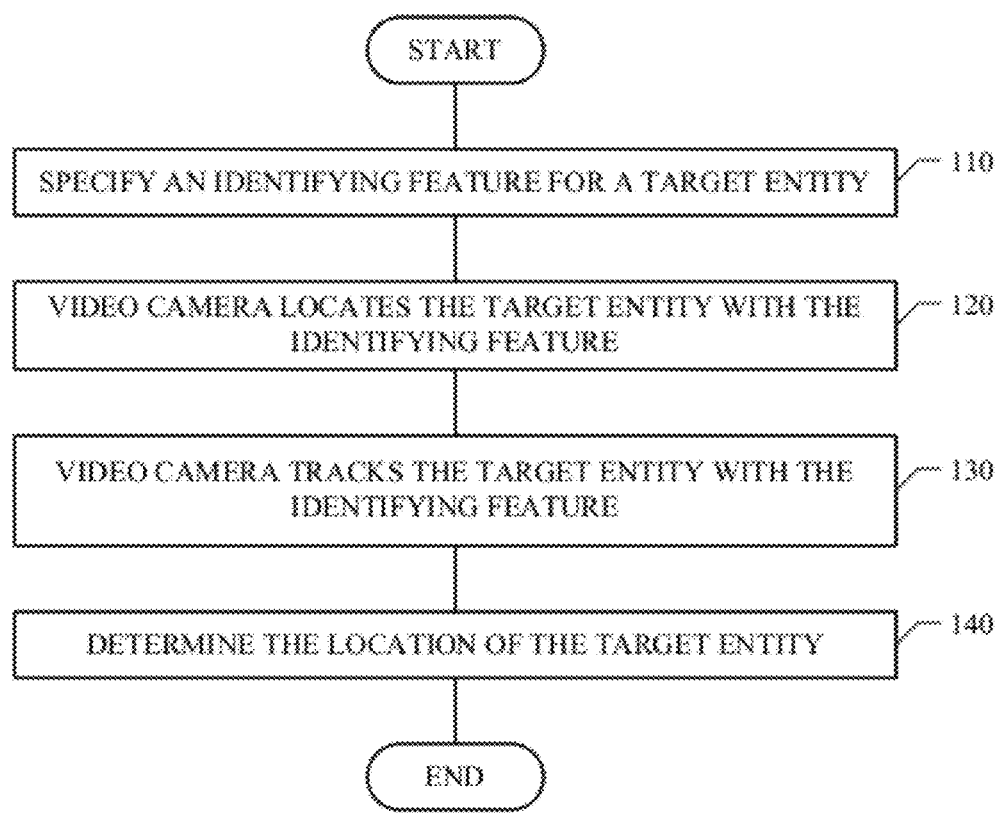
FIG. 1 illustrates an example method for tracking a moving entity.
Figure 2:
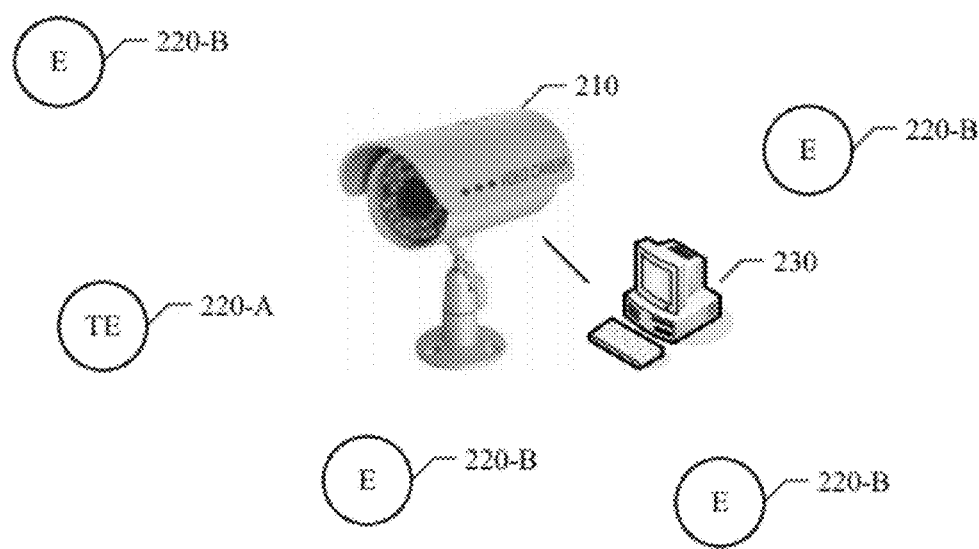
FIG. 2 illustrates an example video camera and several example entities in the vicinity of the video camera.

FIG. 1 illustrates an example method for tracking a moving entity. FIG. 2 illustrates an example video camera 210 and several example entities 220 in the vicinity of the video camera. FIGS. 1 and 2 are described in connection with each other.

Particular embodiments may program a video camera with an identifying feature of a target entity, as illustrated in STEP 110 of FIG. 1. In particular embodiments, an entity may be a human, an animal, or an object of any type. The target entity is the entity that is to be tracked by the video camera. For example, FIG. 2 illustrates an example video camera 210. There are several entities 220 in the vicinity of camera 210. One of these entitles (e.g., entity 220-A) may be selected as the target entity.

There may be various types of identifying features that may be associated with a target entity (e.g., target entity 210-A). In particular embodiments, an identifying feature associated with the target entity may require that the target entity is in the line of sight of a camera (e.g., camera 210) in order for the camera to be able to track the target entity. For example, the identifying feature may be a barcode or Quick Response (QR) code, such that camera 210 may be programmed to track an entity with the barcode or QR code attached to it. A QR code is a matrix barcode or two-dimensional code readable by QR barcode readers or cameras. As another example, the identifying feature may be a uniform (e.g., a jacket or a hat) or a badge, such that camera 210 may be programmed to track an entity (e.g., a person) wearing the uniform (e.g., an employee wearing a company uniform) or badge. As a third example, the identifying feature may be a color (e.g., red), such that camera 210 may be programmed to track a red or mostly red entity (e.g., a red ball or a child wearing a red outfit). As a fourth example, the identifying feature may be a pattern (e.g., checkerboard pattern), such that camera 210 may be programmed to track an entity having such a pattern. In fact, any identifying feature may be used to identify a target entity.

Alternatively, in particular embodiments, an identifying feature associated with the target entity does not require that the target entity is in the line of sight of a camera (e.g., camera 210) in order for the camera to be able to track the target entity. In this case, even if the target entity is behind or obscured by another entity (e.g., a piece of furniture or a wall), the camera is still able to track the target entity. For example, the identifying feature may be a Radio-Frequency Identification (RFID) tag, such that camera 210 may be programmed to track an entity with the RFID tag attached to it. As another example, the identifying feature may be a specific radio frequency, such that camera 210 may be programmed to track an entity transmitting a signal at the specific radio frequency. As a third example, the identifying feature may be a specific wireless signal (e.g., a Bluetooth signal), such that camera 210 may be programmed to track an entity transmitting the specific wireless signal. Again, any identifying feature may be used to identify a target entity.

In particular embodiments, there may be a software application associated with the camera, through which the identifying feature of the target entity may be programmed into the camera. The software application may be implemented using a suitable programming language and the instruction code may be stored in a computer-readable, non-transitory, and tangible storage medium. In particular embodiments, the camera itself may include processors, memories, and other hardware components so that the software application may be executed on the camera. In this case, the camera may support the additional functionalities of a computing device. Alternatively, in particular embodiments, the camera may be coupled to a computing device (e.g., a desktop or notebook computer). In this case, the computing device may host the software application and manage the operations of the camera. For example, in FIG. 2, camera 210 is coupled to a computer 230. Computer 230 and camera 210 may be connected through wire lines (e.g., Ethernet) or wirelessly.

In particular embodiments, a user may select the identifying feature of the target entity and program the identifying feature into the camera through, for example, the software application associated with the camera. In particular embodiments, the camera may locate and acquire the target entity using the identifying feature, as illustrated in STEP 120 of FIG. 1. How the camera locate and acquire the target entity often depends on what the identifying feature is. For example, if a RFID tag is attached to the target entity, then there may be a RFID reader incorporated in the camera, which may be used to read the RFID tag. If a barcode or QR code is attached to the target entity, then there may be a barcode reader incorporated in the camera, which may be used to read the barcode or the QR code. Alternatively, the camera, optionally with the associated software application, may be able to recognize the QR code pattern. If the identifying feature of the target entity is a color, a pattern, a uniform, a badge, etc., the camera may take digital images of the entities in its vicinity, and the software application may process the digital images using, for example, various image recognition or pattern recognition algorithms to identify the target entity with the identifying color, pattern, uniform, badge, etc. As another example, the target entity may have a transmitter for transmitting a radio signal at a specific frequency or a specific type of radio signal (e.g., a Bluetooth signal). In this case, the camera may incorporate a receiver for receiving the radio signal, and the software application may identify the target entity that transmits the signal at the specific frequency or the specific type of signal.

In particular embodiments, once the target entity is located (e.g., acquired by the camera), the camera may track the target entity, even while the target entity is moving, using the identifying feature, as illustrated in STEP 130 of FIG. 1. In particular embodiments, the camera may track the target entity using the identifying feature in manners similar to those described above. For example, if a RFID tag is attached to the target entity, then the RFID reader incorporated in the camera may be used to read the RFID tag. If the entity moves, the RFID tag attached to the target entity also moves with the target entity. The RFID reader incorporated in the camera may be used to read the RFID tag from time to time or periodically, and thus locate the moving target entity, as long as the RFID tag attached to the target entity is within the range of the RFID reader incorporated in the camera. As another example, if a barcode or QR code is attached to the target entity, then the barcode reader incorporated in the camera may be used to read the barcode or QR code from time to time or periodically. Again, if the entity moves, the barcode or QR code attached to the target entity also moves with the target entity. The barcode reader incorporated in the camera may be used to read the barcode or QR code, and thus locate the target entity, as long as the barcode or QR code attached to the target entity is within the range of the barcode reader incorporated in the camera. As a third example, if the target entity is identified by a pattern or color, then when the target entity moves, the camera may follow the identifying pattern or color, and thus locate the target entity. The camera may take digital images of the target entity periodically, and the associated software application may process the digital images for image or pattern recognition in order to locate the target entity.

Because the target entity is identified by an identifying feature (e.g., RFID tag, barcode or QR code, color, pattern, radio signal, etc.), the camera is able to track the target entity regardless of whether the target entity is moving or stationary. As a result, the camera is able to continuously film the target entity while the camera tracks the target entity. If there are other entities that are moving in the vicinity of the camera or of the target entity, because these other entities do not possess the identifying feature, the camera may ignore them and concentrate on specifically tracking and filming the target entity instead.

As described above, in particular embodiments, an identifying feature (e.g., a RFID tag or a radio signal) does not require that the target entity is in the line of sight of the camera. In this case, even when the target entity is obscured by another entity, the camera is still able to track the target entity while the target entity is not in the line of sight of the camera, although the camera may not be able to film the target entity while the target entity is not in the line of sight of the camera. For example, the RFID reader incorporated in the camera is still able to read the RFID tag attached to the target entity even when target entity is obscured by another entity. As another example, the radio receiver incorporated in the camera is still able to detect and receive the radio signal transmitted by the transmitter attached to the target entity even when target entity is obscured by another entity.

Alternatively, in particular embodiments, an identifying feature (e.g., a barcode or QR code, a color, or a pattern) requires that the target entity is in the line of sight of the camera. For example, if a barcode is attached to the target entity, the camera or the barcode reader incorporated in the camera is only able to read the barcode while the camera or the barcode reader can scan the barcode. In this case, when the target entity moves behind and is obscured by another entity, the camera may lose track of the target entity. When this happens, for example, the camera may point at the last location before the target entity is obscured by another entity for some time. When the target entity reemerges from behind the other entity, the camera may reacquire the target entity. Alternatively, the camera may scan its vicinity from time to time to check whether the target entity is again in the line of sight of the camera, and if so, the camera may reacquire and resume tracking the target entity.

In particular embodiments, at a given time, the location of the target entity may be determined, as illustrated in STEP 140 of FIG. 1. In particular embodiments, the software application associated with the camera may determine the location (e.g., the coordinates) of the target entity based on the identifying information received from the target entity. For example, if the target entity transmits a radio signal, this signal may be used to triangulate the current location of the target entity at a given time. As another example, if the target entity is attached with a RFID tag or a barcode or QR code, the RFID or barcode reader incorporated in the camera may collect information that may be used to determine the current location of the target entity at a given time.

In particular embodiments, the camera may continue tracking and filming the target entity until another identifying feature is programmed into the camera (e.g., by a user). If the camera loses track of the target entity for some reason (e.g., the target entity moves out of the range of the camera or is obscured by another entity), the camera may scan its vicinity and when possible (e.g., the target entity moves back in the range of the camera or is not longer obscured by another entity), reacquire and resume tracking and filming the target entity using the identifying feature in manners, for example, similar to those described above when the camera first acquire the target entity.

In particular embodiments, each target entity may have a unique identifying feature that is not possessed by other entities in the vicinity. This unique identifying feature may be programmed into a specific camera so that the camera may track the target entity. In particular embodiments, if multiple entities within an area need to be tracked at the same time (i.e., there are multiple target entities), each target entity may be tracked and filmed using a different camera. In this case, the unique identifying feature of each target entity may be programmed into a separate camera, and each camera may track the specific target entity whose unique identifying feature is programmed into it individually.

Figure 3:
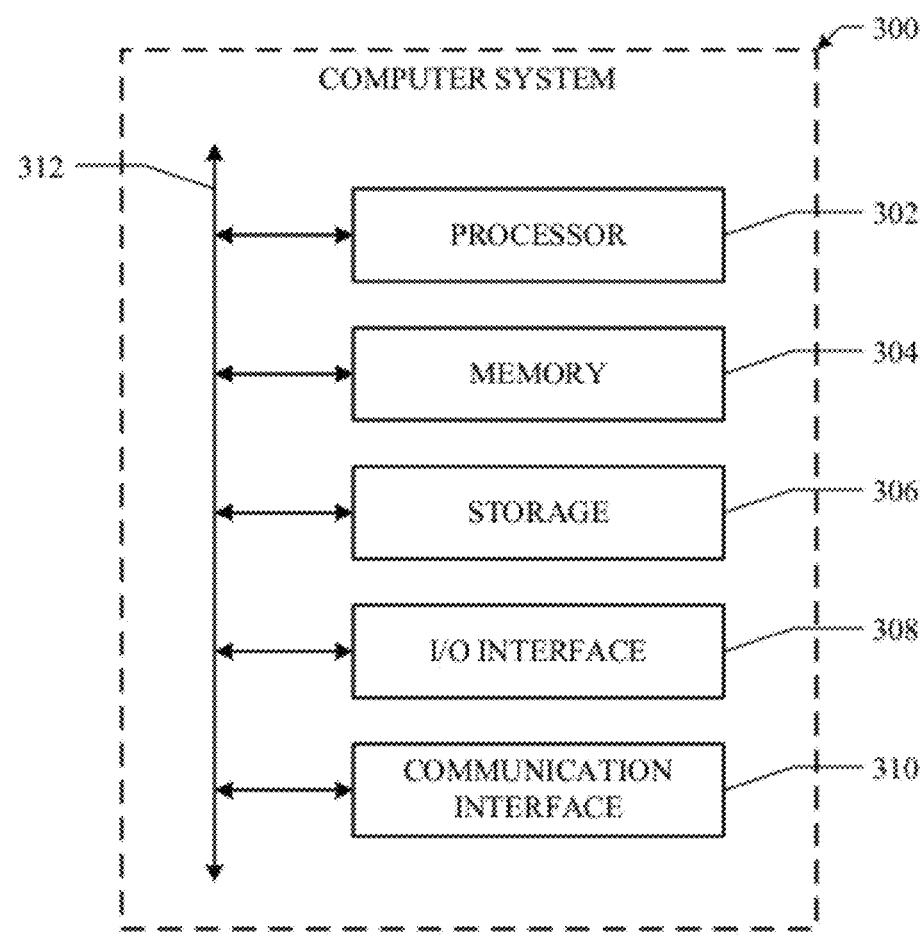
FIG. 3 illustrates an example computer system.

Particular embodiments may be implemented on one or more computer systems. FIG. 3 illustrates an example computer system 300. For example, computer system 300 may be coupled to a video camera. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 300 may include one or more computer systems 300; be unitary or distributed; span multiple locations; span multiple machines; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include an HDD, a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 302 (such as, for example, one or more internal registers or caches), one or more portions of memory 304, one or more portions of storage 306, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising: by one or more computing devices,
receiving an identifying feature of a target entity, the identifying feature requiring that the target entity to be in a line of sight of a camera for the camera to recognize the identifying feature, the identifying feature selected from the group consisting of a barcode associated with the target entity, a Quick Response code associated with the target entity, a color of the target entity, and a pattern of the target entity;
locating the target entity using the camera based on the identifying feature and without using any radio frequency identifiers; and
tracking the target entity using the camera based on the identifying feature, including:
periodically capturing digital images with the camera;
identifying the target entity in the captured digital images based on recognition of the identifying feature in the captured digital images; and
following the target entity with the camera optics by moving the camera optics as the target moves.

2. The method of claim 1, wherein the identifying feature is a bar code or Quick Response code associated with the target entity.

3. The method of claim 1, wherein the identifying feature is a color or pattern of the target entity.

4. The method of claim 1, further comprising determining a current location of the target entity.

5. The method of claim 1, further comprising relocating the target entity using the camera based on the identifying feature after the camera loses track of the target entity.

6. The method of claim 1, wherein:
the target entity is one of a plurality of entities in a vicinity of the camera; and
one or more of the entities are moving entities.

7. A system comprising:
a memory comprising instructions executable by one or more processors; and
the one or more processors coupled to the memory and operable to execute the instructions, the one or more processors being operable when executing the instructions to:
receive an identifying feature of a target entity, the identifying feature requiring that the target entity to be in a line of sight of a camera for the camera to recognize the identifying feature, the identifying feature selected from the group consisting of a barcode associated with the target entity, a Quick Response code associated with the target entity, a color of the target entity, and a pattern of the target entity;
locate the target entity using the camera based on the identifying feature and without using any radio frequency identifiers; and
track the target entity using the camera based on the identifying feature, including:
periodically capturing digital images with the camera;
identifying the target entity in the captured digital images based on recognition of the identifying feature in the captured digital images; and
following the target entity with the camera optics by moving the camera optics as the target moves.

8. The system of claim 7, wherein the identifying feature is a bar code or Quick Response code associated with the target entity.

9. The system of claim 7, wherein the identifying feature is a color or pattern of the target entity.

10. The system of claim 7, wherein the processors are further operable when executing the instructions to determine a current location of the target entity.

11. The system of claim 7, wherein the processors are further operable when executing the instructions to relocate the target entity using the camera based on the identifying feature after the camera loses track of the target entity.

12. The system of claim 7, wherein:
the target entity is one of a plurality of entities in a vicinity of the camera; and
one or more of the entities are moving entities.

13. One or more computer-readable non-transitory storage media embodying software operable when executed by one or more computer systems to: receive an identifying feature of a target entity, the identifying feature requiring that the target entity to be in a line of sight of a camera for the camera to recognize the identifying feature; locate the target entity using the camera based on the identifying feature, the identifying feature selected from the group consisting of a barcode associated with the target entity, a Quick Response code associated with the target entity, a color of the target entity, and a pattern of the target entity, and without using any radio frequency identifiers; and track the target entity using the camera based on the identifying feature including: periodically capturing digital images with the camera; identifying the target entity in the captured digital images based on recognition of the identifying feature in the captured digital images and following the target entity with the camera optics by moving the camera optics as the target moves.

14. The media of claim 13, wherein the identifying feature is a Radio-Frequency Identification (RFID) tag associated with the target entity.

15. The media of claim 13, wherein the identifying feature is a radio signal associated with the target entity.

16. The media of claim 13, wherein the software is further operable when executed by the computer systems to determine a current location of the target entity.

17. The media of claim 13, wherein the software is further operable when executed by the computer systems to relocate the target entity using the camera based on the identifying feature after the camera loses track of the target entity.

18. The media of claim 13, wherein:
the target entity is one of a plurality of entities in a vicinity of the camera; and
one or more of the entities are moving entities.

19. A system comprising:
means for receiving an identifying feature of a target entity, the identifying feature requiring that the target entity to be in a line of sight of a camera for the camera to recognize the identifying feature, the identifying feature selected from the group consisting of a barcode associated with the target entity, a Quick Response code associated with the target entity, a color of the target entity, and a pattern of the target entity;
means for locating the target entity using the camera based on the identifying feature and without using any radio frequency identifiers; and
means for tracking the target entity using the camera based on the identifying feature, including:
periodically capturing digital images with the camera;
identifying the target entity in the captured digital images based on recognition of the identifying feature in the captured digital images; and
following the target entity with the camera optics by moving the camera optics as the target moves.

20. The method of claim 1, wherein moving the camera optics comprises at least one of panning the camera and tilting the camera.

21. The system of claim 7, wherein moving the camera optics comprises at least one of panning the camera and tilting the camera.

22. The media of claim 13, wherein moving the camera optics comprises at least one of panning the camera and tilting the camera.

23. The system of claim 19, wherein moving the camera optics comprises at least one of panning the camera and tilting the camera.

* * * * *